United States Patent
Nishimura et al.

[11] Patent Number: 5,814,772
[45] Date of Patent: *Sep. 29, 1998

[54] WEIGHING APPARATUS WITH WEIGHT DETECTING CONVEYOR

[75] Inventors: Ryoji Nishimura; Yukio Wakasa; Ryoichi Sato, all of Shiga, Japan

[73] Assignee: Ishida Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 582,511

[22] Filed: Jan. 3, 1996

[30] Foreign Application Priority Data

Jan. 11, 1995 [JP] Japan .................................. 7-019748

[51] Int. Cl.$^6$ .................................................. G01G 19/00
[52] U.S. Cl. ......................................... 177/145; 177/25.13
[58] Field of Search .............................. 177/25.11, 25.13, 177/119, 145, 121

[56] References Cited

U.S. PATENT DOCUMENTS

Re. 29,944  3/1979  Hyer et al. .............................. 177/121
4,071,102   1/1978  Van Ostenbridge et al. ........... 177/165
4,418,773   12/1983 Finet et al. ............................... 177/16
4,709,770   12/1987 Kohashi et al. .......................... 177/50
4,803,354   2/1989  Onodera et al. ......................... 341/13
5,308,930   5/1994  Tokutu et al. ....................... 177/25.13
5,635,679   6/1997  Kohashi et al. ..................... 177/25.13

Primary Examiner—Hezron E. Williams
Assistant Examiner—Randy W. Gibson
Attorney, Agent, or Firm—Majestic, Parsons, Siebert & Hsue P.C.

[57] ABSTRACT

A weighing apparatus has a weighing conveyor with a conveyor belt driven by a drive motor for transporting and weighing an object at the same time and outputting a weight signal indicative of its weight. The lengths of the weighing conveyor and the object in the direction of transportation are inputted and the weight signals outputted by the weighing conveyor are filtered so as to eliminate vibration components due to the vibration of the conveyor. The distance traveled by the object on the weighing conveyor is detected from the angle of rotation of the drive motor, and the timing for processing the weight signals, or when to start the measurement of weight and when to obtain the weight value, is determined independent of the transportation speed of the belt but from the detected distance traveled by the object and the inputted length values.

18 Claims, 2 Drawing Sheets

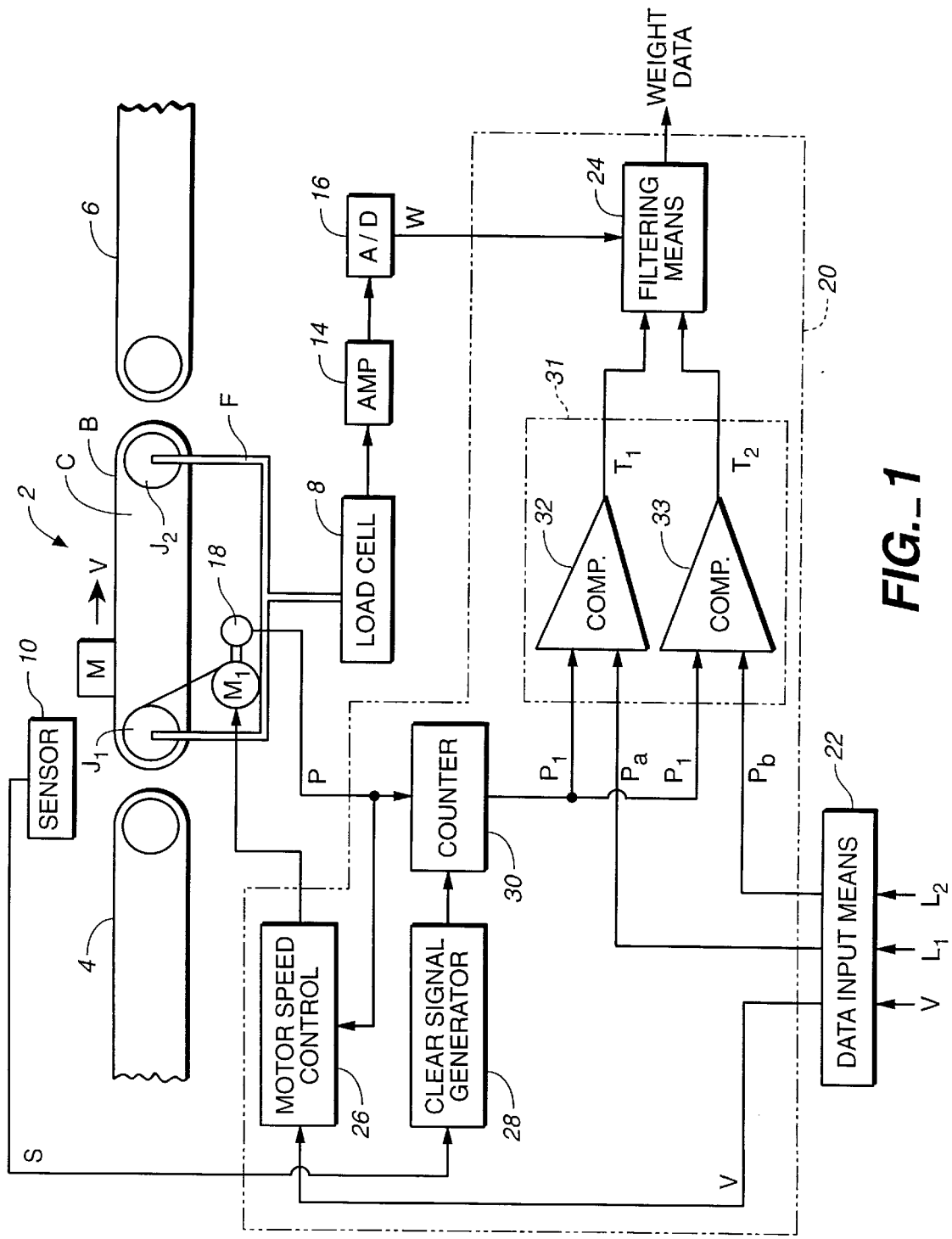
FIG._1

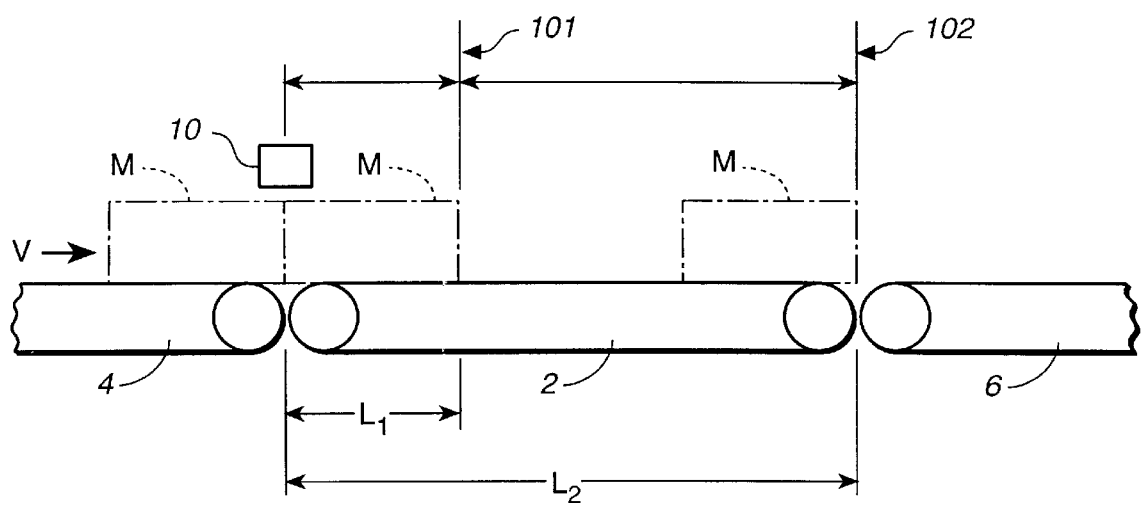
FIG._2

WEIGHING APPARATUS WITH WEIGHT DETECTING CONVEYOR

FIELD OF TECHNOLOGY

This invention relates to a weighing apparatus of a kind having a conveyor belt supported by a weight detecting device such as a load cell for measuring the weight of a target object while this target object is being transported by the conveyor belt.

BACKGROUND OF THE INVENTION

For continuously measuring the weights of a large number of objects produced at a factory, for example, it has been known to make use of a weighing apparatus provided with a feed-in conveyor, a weighing conveyor and a discharge conveyor such that the objects received from the feed-in conveyor are sequentially weighed by a weight detecting device such as a load cell of the weighing conveyor while it is being transported thereon and is thereafter discharged by the discharge conveyor.

To explain more in detail how the weight of an object is detected, the front end of the object is first detected by a sensor provided between the feed-in conveyor and the weighing conveyor as the object is transferred from the feed-in conveyor onto the weighing conveyor. Subsequently, the weighing operation is started (at an appropriate starting time) after the object has come to be entirely on the weighing conveyor, and weight signals received thereafter are analyzed. Since the weight signals contain vibration components due to the vibrations of the belt conveyor, it is necessary to remove such vibration components by means of a filter. Thus, the actual weight value is obtained not only after the weighing operation has been started but also after the vibration components have been eliminated by the filter. Only these weight signals received during the data taking time are depended upon for obtaining the true weight of the object.

The timing for thus processing the weight signals is determined on the basis of input parameters including the length $L_1$, of the object in the direction of its transportation, the length $L_2$ of the weighing conveyor in the direction of its transportation, the speed V of transportation by the weighing conveyor and the filtering time t. The starting time for the weighing will be $L_1/V$ after the front end of the object is detected by the sensor, and the data taking time will be thereafter by the filtering time t determined according to the transportation speed V. Since it is generally desirable to make the filtering time t as long as possible from the point of view of the elimination of vibration components, it is usually set equal to the time during which the object remains on the weighing conveyor, or $(L_2-L_1)/V$. Japanese Patent Publication Tokkai 3-141161 has disclosed a weighing apparatus of this type, adapted to carry out measurement operations according to a specified timing program.

If the transportation speed V of such a weighing apparatus is increased in order, for example, to improve the rate of production, its timing program including the starting time for measuring weights and the data taking time for calculating weight values must be determined according to the new value of V. Since the filtering time t corresponding to the new value of v must also be inputted, it was a cumbersome operation with such a prior art weighing apparatus. Another problem with prior art weighing apparatus was that the rotational speed of the motor for driving the weighing conveyor may be affected by a change in the load, depending on the capacity of the motor, such that the inputted value of the transportation speed may become different from the real value of the speed. This will cause a shift in the timing program, and make high-accuracy measurements impossible.

SUMMARY OF THE INVENTION

It is therefore an object of this invention to eliminate such problems of prior art weighing apparatus by providing an improved weighing apparatus capable of high-accuracy measurements in spite of changes in the speed of transportation by the weighing conveyor.

A weighing apparatus according to this invention, with which the above and other objects can be accomplished, may be characterized not only as driving a conveyor by a drive motor to transport an object thereon and weigh it at the same time and having a data input means for inputting the lengths of the object and the conveyor in the direction of transportation and a filtering means for filtering weight signals outputted from the conveyor, but also a distance detecting means for detecting the distance traveled by the object on the conveyor from the angle of rotation of the drive motor and a timing setting means for setting a timing program for processing the weight signals according to the traveled distance by the object detected by the distance detecting means and the length values of the object and the conveyor inputted through the data input means.

With a weighing apparatus thus structured, the timing program for the processing of the weight signals is determined by the position of the object, or the distance traveled by the object, as well as the lengths of the object and the conveyor. In other words, the timing need not be reset whenever the speed of transportation of the conveyor is changed. As a result, the determination of the timing program is simplified and its accuracy is improved. Throughout herein, expressions like "timing" and "timing program" are used to indicate the points in time at which weight measurement is to be started and at which a weight value is obtained from the weight signals.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic block diagram of a weighing apparatus embodying this invention; and FIG. 2 is a schematic side view of a portion of the weighing apparatus of FIG. 1.

DETAILED DESCRIPTION OF THE INVENTION

Next, the invention is described with reference to FIG. 1 which is a schematic block diagram of a weighing apparatus embodying this invention. The weighing apparatus comprises a weighing conveyor 2 which includes a conveyor C driven by a drive motor $M_1$, a weighing device 8 such as a load cell adapted to measure the weight of an object M on the conveyor C while it is being transported thereby, a rotation detector means 18 for detecting the angle of rotation of the drive motor $M_1$, a feed-in conveyor 4 for receiving the object M and transferring it to the weighing conveyor 2, a discharge conveyor 6 for discharging the object M received from the weighing conveyor 2, a detector sensor 10 disposed at the boundary between the feed-in conveyor 4 and the weighing conveyor 2, a data input means 22 for inputting values of the length $L_1$ of the object M in the direction of its transportation (herein simply referred to as "the object length $L_1$") and the length $L_2$ of the weighing conveyor 2 in the direction of its transportation (herein simply referred to as "the conveyor length $L_2$"), and a control unit 20 which controls the operation of this apparatus as a whole.

The conveyor C includes a driver roller $J_1$ connected to the drive motor $M_1$, a follower roller $J_2$ and a conveyor belt B stretched therebetween, and its weight is carried through a frame F by the weighing device (or load cell) 8. An angle detector 18 such as an encoder is attached to the drive motor $M_1$ for generating pulse signals P according to its rotation, indicative of the angle by which it rotates. A distance detector 30 comprises a counter for counting the number of pulse signals P, beginning the counting when the front end of the object M is detected by the detector sensor 10 and outputting a distance-indicating signal $P_1$, or pulses the number of which indicates the distance by which the object M has moved on the weighing conveyor 2.

The detector sensor 10, disposed between the feed-in conveyor 4 and the weighing conveyor 2, is adapted to detect the front end of the object M by an optical means. It may be of a transmissive type or a reflective type, comprising a light-emitting element and a light-receiving element and outputting a detection signal S when, for example, the light emitted from the light-emitting element is screened by the object M and thereby fails to reach the light-receiving element. The detection signal S is received by a clear signal generator 28, of which the function is to zero-clear the counter 30.

The control unit 20 includes not only the counter 30 and the clear signal generator 28 but also a filtering means 24, a motor speed control unit 26 and a timing setting means 31. The filtering means 24 is for filtering weight signals by numerical calculations. An analog weight signal outputted from the weight detector 8 is inputted through an amplifier 14 (AMP) into an analog-to-digital converter 16 (A/D) and is thereby converted into a digital signal W which is received by the filtering means 24 to undergo a filtering process. As a result, the vibration components due, for example, to the vibrations of the belt conveyor are removed, and a weight data value corresponding accurately to the weight of the object M is outputted. The motor speed control unit 26 is adapted to control the speed of rotation of the drive motor $M_1$ for the weighing conveyor 2. The pulse signals P outputted from the angle detector 18 are fed back to the motor speed control unit 26 such that the rotational speed of the driver motor $M_1$ is controlled on the basis of the number of the pulse per unit time. The timing setting means 31 includes a timing judging means comprised of comparators 32 and 33 (COMP) and is adapted to determine the timing for starting to take in weight signals for the object M and determining its weight.

According to this invention, the aforementioned timing for starting to take in weight signals and determining the weight is set by the timing setting means 31 on the basis of the position of the object M on the weighing conveyor 2. The manner of setting the timing is explained in detail below with reference to FIG. 2.

By the timing for starting to take in weight signals is meant the point in time at which the object M has just been transferred from the feed-in conveyor 4 completely onto the weighing conveyor 2. When the detector sensor 10 detects the front end of the object M between the feed-in conveyor 4 and the weighing conveyor 2 and thereby outputs the detection signal S, the counter 30 starts counting the pulse signals P. When, thereafter, the number of the counted pulse signals P reaches the value corresponding to the object length $L_1$, this is set as the time for starting to take in weight signals (when the front end of the object M should be at the position indicated by numeral 101 in FIG. 2).

By the timing for determining the weight is meant the point in time at which the filtering means 24 has completed its filtering operations and the weight of the object M is ready to be determined, and this point in time is reached when the front end of the object M has reached the downstream end (indicated by numeral 102 in FIG. 2) of the weighing conveyor 2 by moving the distance of $L_2$ after it passed the upstream end of the weighing conveyor 2. It should be remembered in this connection that the value of $L_2$ need not be the actual length of the weighing conveyor 2 but may be taken as a certain specified length shorter than the actual length of the weighing conveyor 2 such as 0.9 times the actual length.

Next, the operation of the apparatus is described in detail. As the object M is completely transferred onto the weighing conveyor 2, signals from the weighing device 8 are amplified by the amplifier 14, converted into digital signals by the analog-to-digital converter 16 and thereafter received by the control unit 20. Inside the control unit 20, the weight signals M are filtered by the filtering means 24, and the vibration components due, for example, to the vibrations of the conveyors are eliminated from the weight signals.

Data on the rotation of the drive motor $M_1$ for driving the weighing conveyor 2 are inputted into the motor speed control unit 26 whereby the rotational speed of the drive motor $M_1$ is controlled so as to match the conveyor speed set through the data input means 22.

As the data input means 22 is operated to input selected values of the conveyor speed V of the weighing conveyor 2, the object length $L_1$, and the conveyor length $L_2$, the count value $P_a$ corresponding to the inputted object length $L_1$ is outputted to the second input terminal of the first comparator 32, and the count value $P_b$ corresponding to the inputted conveyor length $L_2$ is outputted to the second input terminal of the second comparator 33. When the front end of the object M is detected by the detector sensor 10, the detection signal S is outputted to the clear signal generator 28. When the detection signal S is received, the clear signal generator 28 causes the counter 30 to be zero-cleared, or to set its count value to zero, and the counter 30 begins to count the number of pulse signals P from the angle detector 18. The number $P_1$ of pulse signals counted thereafter by the counter 30 is inputted into the first input terminals of the first and second comparators 32 and 33. This number $P_1$ of pulse signals represents the distance by which the object M has moved. For example, 2000 pulses may correspond to a distance of 1 meter.

The comparators 32 and 33 are each adapted to compare the values of the pulse counts received through the first and second input terminals and to output timing signals $T_1$ and $T_2$, respectively, when the count values received through the two input terminals come to coincide. Explained more in detail, when the count number $P_1$ received by the first comparator 32 through its first input terminal coincides with the count number $P_a$ corresponding to the object length $L_1$ and received through its second input terminal, a first timing signal $T_1$ is outputted to the filtering means 24, indicating that it is the time to start the weighing operations and causing its filtering operations to be started. In this manner, it is made certain that the filtering means 24 will output weight signals representing only the entire weight of the object M. When the count number $P_1$ received by the second comparator 33 through its first input terminal coincides with the count number $P_b$ corresponding to the conveyor length $L_2$ and received through its second input terminal, a second timing signal $T_2$ is outputted to the filtering means 24, causing the weight data at that point in time to be treated as representing the weight value.

In summary, the timing for various operations is determined independently of the transportation speed V of the weighing conveyor 2 according to this invention. Since this further makes it unnecessary to input the time value t needed for the filtering which will correspond to the transportation speed V, accurate weighing becomes possible whether or not the speed of transportation v is varied. When a sorter is used in combination with the weighing apparatus, disposed on the downstream side for sorting the weighed objects M according to their measured weights, the distance between the upstream end of the weighing conveyor 2 and such a sorter may be inputted through the data input means 22 such that the timing for the sorting operation can be controlled by comparing this distance with the count $P_1$ of the pulse signals. In other words, the present invention can also make it possible to smoothly perform a sorting operation.

What is claimed is:

1. A weighing apparatus comprising:
   a weighing conveyor with a conveyor belt driven by a drive motor for transporting and weighing an object at the same time and outputting a weight signal indicative of the weight of said object;
   a data input means for inputting a first length value representing the length of said weighing conveyor in the direction of transporting of said weighing conveyor and a second length value representing the length of said object in the direction of transportation of said weighing conveyor;
   a filtering means for filtering weight outputted by said weighing conveyor as representing the weight of said object;
   a distance detecting means for detecting the distance traveled by said object on said weighing conveyor from the angle of rotation of said drive motor; and
   a timing setting means for setting a timing program for processing said weight signals directly on the basis of the position of said object on said weighing conveyor as determined in real time by said distance detected by said distance detecting means, said first length value and said second length value.

2. The weighing apparatus of claim 1 further comprising a detector sensor at an upstream end of said weighing conveyor for detecting said object.

3. The weighing apparatus of claim 1 wherein said distance detecting means comprises an angle detector for outputting pulse signals indicative of the rotary motion of said drive motor.

4. The weighing apparatus of claim 3 wherein said distance detecting means further comprises a counter for counting said pulse signals outputted from said angle detector and thereby outputting distance-indicating signals indicative of the distance traveled by said object on said weighing conveyor.

5. The weighing apparatus of claim 4 wherein said timing setting means includes comparators for receiving said distance-indicating signals and comparing the distance indicated by said distance-indicating signals with said first and second length values.

6. The weighing apparatus of claim 2 wherein said distance detecting means comprises an angle detector for outputting pulse signals indicative of the rotary motion of said drive motor.

7. The weighing apparatus of claim 6 wherein said distance detecting means further comprises a counter for counting said pulse signals outputted from said angle detector and thereby outputting distance-indicating signals indicative of the distance traveled by said object on said weighing conveyor.

8. The weighing apparatus of claim 7 wherein said timing setting means includes comparators for receiving said distance-indicating signals and comparing the distance indicated by said distance-indicating signals with said first and second length values.

9. The weighing apparatus of claim 6 further comprising a clear signal generator for zero-clearing said counter when said detector sensor detects said object.

10. A weighing apparatus comprising:
    a weighing conveyor with a conveyor belt driven by a drive motor for transporting from an upstream end to a downstream end of said conveyor belt and weighing an object at the same time and outputting a weight signal indicative of the weight of said object;
    a data input means for inputting a first length value representing the length of said weighing conveyor in the direction of transporting of said weighing conveyor and a second length value representing the length of said object in the direction of transportation of said weighing conveyor;
    a filtering means for filtering weight signals outputted by said weighing conveyor as representing the weight of said object;
    a distance detecting means for detecting the distance traveled by said object on said weighing conveyor from the angle of rotation of said drive motor; and
    a timing setting means for setting a starting time and a weight-determining time directly on the basis of the position of said object on said weighing conveyor as determined in real time by the distance detected by said distance detecting means, said first length value and said second length value;
    said starting time representing when said object has been transferred completely onto said conveyor belt and said weight signals from said weighing conveyor begin to be received by said filtering means, and said weight-determining time representing when said object reaches said downstream end of said conveyor belt and said filtering means finishes filtering said weight signals and is thereby ready to determine the weight of said object.

11. The weighing apparatus of claim 10 further comprising a detector sensor at an upstream end of said weighing conveyor for detecting said object.

12. The weighing apparatus of claim 10 wherein said distance detecting means comprises an angle detector for outputting pulse signals indicative of the rotary motion of said drive motor.

13. The weighing apparatus of claim 12 wherein said distance detecting means further comprises a counter for counting said pulse signals outputted from said angle detector and thereby outputting distance-indicating signals indicative of the distance traveled by said object on said weighing conveyor.

14. The weighing apparatus of claim 13 wherein said timing setting means includes comparators for receiving said distance-indicating signals and comparing the distance indicated by said distance-indicating signals with said first and second length values.

15. The weighing apparatus of claim 11 wherein said distance detecting means comprises an angle detector for outputting pulse signals indicative of the rotary motion of said drive motor.

16. The weighing apparatus of claim 15 wherein said distance detecting means further comprises a counter for counting said pulse signals outputted from said angle detector and thereby outputting distance-indicating signals indicative of the distance traveled by said object on said weighing conveyor.

17. The weighing apparatus of claim 16 wherein said timing setting means includes comparators for receiving said distance-indicating signals and comparing the distance indicated by said distance-indicating signals with said first and second length values.

18. The weighing apparatus of claim 15 further comprising a clear signal generator for zero-clearing said counter when said detector sensor detects said object.

* * * * *